United States Patent [19]

Warren

[11] 4,278,778

[45] Jul. 14, 1981

[54] SYNERGISTIC PREVULCANIZATION INHIBITOR FOR HALOPOLYMER WITH DIAMINOPROPANE AND CYCLOHEXYLTHIOPHTHALIMIDE

[75] Inventor: Norman E. Warren, Baton Rouge, La.

[73] Assignee: The Dow Chemical Company, Midland, Mich.

[21] Appl. No.: 53,139

[22] Filed: Jun. 28, 1979

[51] Int. Cl.$^3$ .............................. C08F 8/34; C08F 8/32
[52] U.S. Cl. .................................... 525/346; 525/330; 525/331; 525/348
[58] Field of Search ............... 525/346, 331, 348, 330, 525/351

[56] References Cited

U.S. PATENT DOCUMENTS

| | | | |
|---|---|---|---|
| 3,023,191 | 2/1962 | Tegge | 525/356 X |
| 3,098,055 | 7/1963 | Lemiszka | 525/346 X |
| 3,317,451 | 5/1967 | Apotheker | 525/330 X |
| 3,755,261 | 8/1973 | Van Gulick | 260/46.5 R |
| 3,838,114 | 9/1974 | Lawrence | 260/780 |
| 3,939,128 | 2/1976 | Behrens | 260/31.2 R |

*Primary Examiner*—C. A. Henderson
*Attorney, Agent, or Firm*—T. R. Wills; D. R. Howard

[57] ABSTRACT

Scorch safety and shelf-life of a heat-curable composition including a chlorine- or bromine-containing halopolymer such as chlorinated polyethylene; a 1,3-diaminopropane or salt thereof; a sulfur source; and an acid acceptor are improved by adding N-(cyclohexylthio)phthalimide and N-nitrosodiphenylamine to the composition.

8 Claims, No Drawings

SYNERGISTIC PREVULCANIZATION INHIBITOR FOR HALOPOLYMER WITH DIAMINOPROPANE AND CYCLOHEXYLTHIOPHTHALIMIDE

BACKGROUND OF THE INVENTION

The present invention relates to heat-curable, chlorine- or bromine-containing halopolymer compositions containing a 1,3-diaminopropane curing agent, a sulfur source, and an acid acceptor and, more particularly, to a synergistic prevulcanization inhibitor therefor.

Chlorine- or bromine-containing halopolymers, such as the chlorinated polymers of ethylene, are well known materials which serve in many useful applications in commerce. These materials, which can be readily prepared, for example, by the polymerization of halogen-containing monomers or by post-halogenation of an olefinic polymer, possess a wide diversity of characteristics depending on several factors such as the structure, molecular weight, and nature of the halopolymer and the amount and distribution of the halogen moieties. Certain chlorine or bromine-containing halopolymers, particularly the high molecular weight chlorinated ethylene polymers, possess properties such that they can be cured to form highly useful, low cost elastomeric products.

Several methods for "curing" (or, alternatively, "vulcanizing" or "crosslinking") such halopolymers are known in the art. Chlorinated polyethylenes, for example, can be cured by reacting at elevated temperatures, a mixture of the desired polymer with organic peroxides, polyfunctional amines, aliphatic polyazo compounds, or a combination of sulfur, a Group II metal oxide, and a rubber vulcanization accelerator. Among these, the reaction with an organic peroxide has attained a prominent position in commercial processes for heat-curing chlorinated polyethylenes due to the high degree of cure achieved thereby.

In a copending U.S. patent application Ser. No. 945,944, filed Sept. 26, 1978, now U.S. Pat. No. 4,204,048, there is disclosed a process for making elastomeric materials by heat-curing a mixture of a chlorine- or bromine-containing halopolymer such as a chlorinated polyethylene, a 1,3-diaminopropane or salt thereof, a sulfur source and an acid acceptor. While the elastomers produced by that method are highly useful and much less expensive than the conventional peroxide-cured elastomers, the starting heat-curable mixtures were found to exhibit premature vulcanization both at room temperature and at elevated processing temperatures. Such premature vulcanization at room temperature (which results in an increase in the viscosity of the heat-curable mixture over time and, accordingly, reduces the shelf-life thereof) and at elevated temperatures (which is manifested by a decrease in scorch safety during processing) would typically be considered disadvantageous by commercial users.

Accordingly, it is an object of the present invention to provide a heat-curable chlorine- or bromine-containing halopolymer composition similar to that described in the aforementioned U.S. patent application, but having improved shelf-life and processing scorch safety.

SUMMARY OF THE INVENTION

In one aspect, the present invention provides an improved heat-curable composition comprising an elastomer-forming, chlorine- or bromine-containing halopolymer such as chlorinated polyethylene; a 1,3-diaminopropane or salt thereof; a sulfur source; an acid acceptor; and a prevulcanization inhibitor combination comprising an amount of N-(cyclohexylthio)-phthalimide and N-nitrosodiphenylamine sufficient to provide an increase in both shelf-life and scorch safety.

In another aspect, the present invention provides an improved method of preparing a heat-curable composition containing a clorine- or bromine-containing halopolymer with a 1,3-diaminopropane or salt thereof, an acid acceptor, and a sulfur source characterized by adding to the composition a prevulcanization inhibitor combination comprising an amount of N-(cyclohexylthio)-phthalimide and N-nitrosodiphenylamine sufficient to provide an increase in both shelf-life and scorch safety.

DETAILED DESCRIPTION OF THE INVENTION

Chlorine- or bromine-containing halopolymers which can be used in the practice of this invention are any of those which form elastomers by heat-curing with an aliphatic polyamine vulcanizing agent. Such polymers include the homopolymers and copolymers of halogen-containing monomers, such as 2-chloro-1,3-butadiene (the polymers of which are commonly known as polychloroprene) as well as those obtained by the post-halogenation of an olefin polymer in solution, in the molten state, or in aqueous suspension according to processes well known in the art. Exemplary halogenating agents which can be employed in such post-halogenation processes include molecular halogens such as chlorine or bromine, interhalogens such as bromo-chlorine, and sulfuryl halides such as sulfuryl chloride.

Particularly preferred halopolymers which can be used in the present invention are the elastomer-forming chlorinated polyethylenes derived by chlorination of a substantially linear, high density polyethylene which has a molecular weight of about 100,000 up to about 5 million, preferably about 700,000 up to about 3.5 million. Such linear high molecular weight polyethylene is well known in the art as are the methods for its preparation. Such methods include, for example, the so-called "Ziegler" slurry process and the process described in British Pat. No. 858,674 (granted to Allied Chemical Corporation on June 11, 1961), wherein anhydrous, oxygen-free ethylene is polymerized in the gas phase at a temperature below the softening point of the polyethylene over a porous frangible catalyst of an inorganic compound of chromium and oxygen and active metal alkyl on a support of the group consisting of silica and silica-alumina.

The polyethylenes produced by the process described in British Pat. No. 858,674 have average molecular weights of about 500,000 to 5 million, generally between 1.0 to 3.5 million, as calculated according to the method of P. S. Francis et al. from the intrinsic vicosities of solutions of the polymer in decahydronaphthalene at 135° C. using the equation:

$$[n] = 6.77 \times 10^{-4} \, M^{0.87}$$

where [n] = intrinsic viscosity
M = average molecular weight
(J. Polymer Science, Vol 31, pp. 453–466, September, 1958). As described in Example 6 of British Pat. No. 858,674, the molecular weight of the polyethylenes can be reduced by thermal treatment to a value as low as about 100,000. Such polyethylenes contain residue of the chromium-silica polymerization catalyst systems dispersed throughout the polyethylene in an amount of at least about 0.001% usually 0.001-0.002% by weight, which is retained in the polyethylene during chlorination and contributes to the properties of the chlorinated polyethylene employed in the elastomeric compositions produced therefrom.

Prior to chlorination, the polyethylene from which the chlorinated polyethylene is derived preferably has a density between about 0.935 and about 0.985 and a crystallinity of at least 75%, and customarily in the range of 75 to 85%, as determined, for example, by differential thermal analysis. Subsequent to the chlorination, the chlorinated polyethylenes are preferably, though not necessarily, characterized by having less than 2% crystallinity, desirably 0% crystallinity, as determined by differential thermal analysis. Chlorinated polyethylenes having chlorine contents of 20-45% and the desired crystallinity can be prepared by a number of methods including the well-known solution chlorination procedures. Most advantageously, the resulting chlorinated polyethylenes will have a chlorine content greater than about 25 weight percent in order to obtain a commercially acceptable degree of crosslinking in the elastomer product.

When the molecular weight of the polyethylene is 500,000 or higher, a particularly advantageous chlorination procedure is accomplished by a two-stage suspension chlorination with the first stage being carried out in aqueous slurry at temperatures below the crystalline melting point of the ethylene polymer, preferably at a temperature of about 60° to 130° C., desirably at 90° to 110° C., until at least about 5%, preferably about 10%, of chlorine has been introduced into the polymer. In the second stage, the chlorination is continued in the aqueous slurry at a temperature maintained above the crystalline melting point of the polymer, but below the softening point of the chlorinated outer coating thereof until the desired chlorine is added. Second-stage chlorination temperatures are of the order of at least about 135° C., and preferably lie in the range of about 135° to 150° C. If desired, chlorination in the second stage may be carried out at a temperature above the crystalline melting point of the polymer for a time sufficient to add at least about 5% chlorine by weight, preferably until at least a total of 25% chlorine is added to the polymer, and the chlorination then continued at a lower temperature, e.g., 110° to 120° C., until the desired total chlorine is added. This chlorination procedure is described in greater detail in French Pat. No. 1,316,044 of Dec. 17, 1962 to Allied Chemical Corporation.

When the molecular weight of the linear polyethylene is less than 500,000, a particularly advantageous and well-known chlorination procedure comprises first forming an aqueous slurry of chlorinated polyethylene by contacting particles of polyethylene with chlorine at an hourly chlorine feed rate of not more than 5 lbs/lb of polyethylene and at a temperature of 100° to 120° C. in aqueous slurry having solids content of not more than 20% by weight. The temperature of the resulting slurry is then raised to the upper limit of the melt range of the polyethylene, but not above 145° C., and then the chlorinated polyethylene is further reacted with chlorine in an aqueous solution to tip said polyethylene with from 1% to 15% by weight of chemically combined chlorine.

The 1,3-diaminopropanes which can be used in the practice of this invention include the unsubstituted compound corresponding thereto as well as those wherein either the carbon or nitrogen moieties are singly or multiply substituted with alkyl, alkenyl, cycloalkyl, or aryl groups. It has been found that the effectiveness of alkyl-substituted 1,3-diaminopropanes decreases with increasing substitution of the nitrogen moieties, i.e., the order of effectiveness of the substituted 1,3-diaminopropanes with respect to N,N'-substitution can be generalized as follows:

$$1°,1° > 1°,2° > 2°,2° > 1°,3° > 2°,3° > 3°,3°$$

In addition, it has been found that substituted 1,3-diaminopropanes are more effective than the unsubstituted compound and that, with respect to alkyl substitution, the effectiveness of a substituted 1,3-diaminopropane increases with increasing alkyl chain length. Consequently, the preferred 1,3-diaminopropanes will be selected accordingly.

With respect to the salts of 1,3-diaminopropanes, it appears that the anion component thereof is not critical so long as it does not interfere with the curing of the halopolymer. Exemplary anions which may be used include carboxylate and dicarboxylate anions such as those derived from acetic acid, oxalic acid, succinic acid, benzoic acid, and the like; halides such as those derived from hydrogen chloride, hydrogen bromide, hydrogen iodide, and the like; and sulfate. When used in conjunction with an acid acceptor, the 1,3-diaminopropanes and the aforementioned carboxylic acid salts thereof appear substantially equivalent in their ability to effect cure.

The amount of a 1,3-diaminopropane or salt thereof which is employed is an amount sufficient to cure the halopolymer to the desired degree and will generally range from about 1 to about 15 parts, preferably from about 1 to about 10 parts, per hundred parts of the halopolymer (hereinafter abbreviated as "phr"). The actual amount needed to effect the desired level of cure will depend upon the particular 1,3-diaminopropane or salt thereof used as well as the relative proportions and strengths of the acid acceptor and sulfur source used (as hereinafter described). Generally, it has been found that an increase in the amount of 1,3-diaminopropane or salt thereof will result in an increase in the extent of cure, a decrease in cure time, and a decrease in scorch time.

It has been found that certain bases are advantageously employed in combination with the 1,3-diaminopropane or salt thereof to further enhance curing of the halopolymer. Exemplary bases which may be used include the oxides, hydroxides, sulfides, carbonates, and phosphates of the alkali metals and alkaline earth metals. Of these calcium hydroxide, calcium oxide, magnesium oxide, and tribasic potassium phosphate are preferred, especially calcium oxide and calcium hydroxide. Powdered molecular sieve has also been found to be effective. However, basic lead carbonate, zinc oxide, and tetraoctadecyl titanate have been found to have a deleterious effect on the curing properties of 1,3-diaminopropanes and salts thereof. Accordingly, the term "acid acceptor" as used herein is intended to include only those bases which provide an increase in the extent of cure compared to that which would be obtained by the use of the 1,3-diaminopropane alone. Guided by the exemplary listed compounds, and with only minor experimentation, a user will be able to readily choose a base suitable for use as an acid acceptor in the present curing system. Generally, the acid acceptor can be employed in amounts ranging from about 1 to about 50 phr, but it is preferably used in amounts of about 1 to about 20 phr. It has been observed that an increase in the amount of acid acceptor will result in an increase in the extent of cure, but also in a decrease in the scorch time. Hence, these effects must be taken into consideration when choosing the amount of acid acceptor to be used.

The curing of a halopolymer with a 1,3-diaminopropane or salt thereof is further advantageously enhanced by employing in combination therewith a sulfur source, i.e., elemental sulfur or a sulfur-containing compound such as sodium thiosulfate, sodium hydrosulfide, tetramethylthiuram disulfide, and dipentamethylene thiuram hexasulfide. Due to its ready availability and low cost, elemental sulfur is preferred. In a fashion similar to the effect of the acid acceptor, an increase in the amount of the sulfur source will increase the extent of cure and decrease the scorch time. Only a minor amount of the sulfur source is required to effect an increase in the extent of cure achieved by the 1,3-diaminopropane. When elemental sulfur is used, for example, the amount may range from about 0.1 to about 10 phr; preferably, from about 0.1 to 3 phr. Advantageously, the amount of the sulfur source should be adjusted relative to the amount of 1,3-diaminopropane or salt thereof employed in order to keep total cure time low. Preliminary studies have shown that a ratio of about 1 part elemental sulfur to about 2.5 parts 1,3-diaminopropane or salt thereof will give an acceptable balance between extent of cure and total cure time.

If desired, a minor amount of iodide or bromide ions can be used in combination with the other aforementioned curing agents to beneficially affect the results otained thereby. Iodide ions are preferred and should be employed in an amount such that the molar ratio of iodide ions to 1,3-diaminopropane or salt thereof is less than about 1:1, whereby both the extent of cure and, surprisingly, scorch time will be increased; larger amounts will decrease the extent of cure. The preferred molar ratio ranges from about 0.2:1 to 0.4:1. It would appear that any suitable source of iodide ions may be used in the present system. Suitable sources include sodium iodide, the alkyl iodides, and like compounds. If desired, the iodide ion can be provided by replacing a portion of the 1,3-diaminopropane or salt thereof to be used with a 1,3-diaminopropane salt having iodide as the anion component.

Further description and exemplary uses of the aforementioned curing agents can be found in U.S. patent application Ser. No. 945,944, filed Sept. 26, 1978, which is hereby incorporated by reference in its entirety into the present application.

The prevulcanization inhibitor provided by the present invention comprises a synergistic combination of N-(cyclohexylthio)phthalimide and N-nitrosodiphenylamine, both of which are well-known, commercially available inhibitors for synthetic and natural rubbers. A sufficient amount of each of these additives will be used in combination to provide an increase in both shelf-life and scorch safety as compared to heat-curable compositions containing neither or only one of the inhibitors. Generally, this amount will be in the range of about 1 to 3 phr, preferably about 2 phr, of N-nitrosodiphenylamine in combination with about 0.1 to 2 phr, preferably about 0.5 to 1 phr, of N-(cyclohexylthio)phthalimide.

In accordance with typical procedures used in the vulcanization art, the heat-curable compositions of the present invention can generally contain other conventional compounding ingredients such as reinforcing agents and fillers, antioxidants, plasticizers, and the like so long as they do not significantly interfere with the curing reaction nor reduce the effectiveness of the aforementioned inhibitor combination. It is noteworthy that the present non-peroxide curing system will permit the use of inexpensive hydrocarbon extending oils as well as the ester plasticizers commonly used with conventional peroxide-cured halopolymer formulations.

Heat-curable compositions in accordance with the present invention can be prepared by admixing the halopolymer, the 1,3-diaminopropane or salt thereof, the sulfur source, the acid acceptor, the inhibitor combination, and other additives, as desired, by blending on a two-roll mill or in a Banbury mixer or other suitable apparatus until homogeneity of the formulation is achieved. In some instances, i.e., when the 1,3-diaminopropane or salt thereof is in the form of a greasy paste, it may be desirable to first heat it and then blend the resulting liquid with an inert solid, such as fumed silica. The so-formed blend can then be cooled, crushed, and added in the form of a free-flowing powder to the other ingredients of the heat-curable composition, thus facilitating rapid mixing therewith. During preparation, care should be taken to maintain the heat-curable composition as cool as possible to avoid excessive heat buildup and premature curing. Compounding temperatures are preferably regulated in the range of about 20° to 120° C. The resulting composition can be shaped by extrusion or other conventional means and cured by heating to a temperature in the range of about 90° to 220° C. The time necessary to effect cure will depend upon the particular composition used and upon the temperature to which it is heated. Usually, such times will range from about 2 minutes to 5 hours. Generally, the temperatures and time periods suitable for cure correspond to those commonly used in the rubber fabrication industry.

The following example illustrates the invention but is not to be taken as limiting its scope. Parts and percentages are by weight unless otherwise indicated or required by context.

EXAMPLE

Various heat-curable compositions (as shown in Table I) were compounded on a two-roll mill with slight cooling on one roll in accordance with ASTM D-15-72. The resulting compositions were then tested for processing characteristics and cured physical properties:

100% Modulus, 200% Modulus, Ultimate Tensile, and Elongation were measured in accordance with ASTM D-412-68 (Tension Testing of Vulcanized—Type "C" Dumbbell—Instron ® Tensile Tester).

Hardness was measured in accordance with ASTM 2240-68 (Indentation Hardness of Rubber and Plastics by means of a Durometer, Shore A).

Mooney Viscosity and Mooney Scorch were measured in accordance with ASTM D1646-72 (Viscosity and Curing Characteristics by Shearing-disk Viscometer).

The results of these tests, as shown in Table II, demonstrate that N-(cyclohexylthio)phthalimide, but not N-nitrosodiphenylamine, alone effectively extends the shelf-life of the heat-curable composition as shown by the lack of a substantial increase in viscosity upon aging. The results further demonstrate that while neither N-(cyclohexylthio)phthalimide nor N-nitrosodiphenylamine alone significantly enhances scorch safety (as shown by the increased in Mooney scorch time), a synergistic combination of the two does.

from about 0.5 to about 1 part per hundred parts of the halopolymer of N-(cyclohexylthio)phthalimide and about 2 parts per hundred parts of the halopolymer of N-nitrosodiphenylamine.

3. A heat-curable composition according to claim 2 wherein the 1,3-diaminopropane comprises an N-alkyl-1,3-diaminopropane wherein the alkyl group contains from about 4 to 20 carbon atoms.

TABLE I

| | Control | Sample[3] For Comparison | | | The Invention | |
|---|---|---|---|---|---|---|
| Ingredient | 1A | 1B | 1C | 1D | 1E | 1F |
| CPE CM 0136[1] | 100 | 100 | 100 | 100 | 100 | 100 |
| SUNDEX 790 extending oil | 30 | 30 | 30 | 30 | 30 | 30 |
| CABOT N774 carbon black | 60 | 60 | 60 | 60 | 60 | 60 |
| MgO | 5 | 5 | 5 | 5 | 5 | 5 |
| $S_8$ | 2 | 2 | 2 | 2 | 2 | 2 |
| DUOMAC T diamine diacetate[2] | 7 | 7 | 7 | 7 | 7 | 7 |
| SANTOGARD PVI N-(cyclohexylthio)phthalimide | — | 0.5 | 1 | — | 0.5 | 1 |
| REDAX N-nitrosodiphenylamine | — | — | — | 2 | 2 | 2 |
| Total | 204 | 204.5 | 205 | 206 | 206.5 | 207 |

Notes:
[1]An elastomer-forming, chlorinated high-density polyethylene having a chlorine content of 36%, residual crystallinity of less than 2%, and a gum stock Mooney Viscosity (ML 1+4 @ 121° C.) of 80 (obtained from The Dow Chemical Company).
[2]A diacetate salt of N-aliphatic-1,2-diaminopropane, wherein the aliphatic group is derived from tallow and is principally a mixture of saturated and unsaturated $C_{16}$ and $C_{18}$ moieties (obtained from Armak Company).
[3]Formulations are given in parts by weight.

TABLE II

| | SAMPLE | | | | | |
|---|---|---|---|---|---|---|
| | Control | For Comparison | | | The Invention | |
| PROPERTIES | 1A | 1B | 1C | 1D | 1E | 1F |
| Mooney Viscosity (MS1 Minimum) 121° C. | | | | | | |
| Initial | 30 | 27.5 | 27 | 21 | 25 | 24.5 |
| Aged 3 Days at Room Temperature | 32 | 28.5 | 26.5 | 28[1] | 25 | 24 |
| Aged 8 Days at Room Temperature | 36 | 29.5 | 28 | 32[2] | 25.5 | 25 |
| Aged 28 Days at Room Temperature | 47 | 34 | 29 | —[3] | 28 | 26 |
| Mooney Scorch MS1 (Δ5) 121° C., Minutes | | | | | | |
| Initial | 4 | 5 | 6.5 | 7 | >20 | 26 |
| Aged 3 Days at Room Temperature | 2.5 | 4.5 | 5.5 | 7[1] | 22.5 | 30 |
| Aged 8 Days at Room Temperature | 2.5 | 4 | 6 | 8[2] | 21 | 32 |
| Aged 28 Days at Room Temperature | 3 | 5 | 7 | —[3] | 23 | >35 |
| Physical Properties After Curing 30 Minutes @ 160° C. | | | | | | |
| 100% Modulus, psi | 447 | 469 | 419 | 427 | 395 | 333 |
| 200% Modulus, psi | 1080 | 1073 | 930 | 947 | 850 | 722 |
| Ultimate Tensile, psi | 1953 | 1951 | 1860 | 1813 | 1800 | 1778 |
| Elongation, % | 470 | 500 | 520 | 470 | 550 | 600 |
| Hardness, Shore A | 69 | 70 | 69 | 67 | 69 | 66 |

Notes:
[1]Aged 4 days at room temperature.
[2]Aged 7 days at room temperature.
[3]Not measured.

What is claimed is:

1. An improved heat curable composition comprising an elastomer-forming, chlorine- or bromine-containing halopolymer; a 1,3-diaminopropane or salt thereof; an acid acceptor; a sulfur source; and a prevulcanization inhibitor wherein the improvement comprises providing as the prevulcanization inhibitor a combination of from about 0.1 to 2 parts per hundred parts of the halopolymer of N-(cyclohexylthio)phthalimide and from about 1 to about 3 parts per hundred parts of the halopolymer of N-nitrosodiphenylamine.

2. An improved heat curable composition comprising an elastomer-forming, chlorine- or bromine-containing halopolymer; a 1,3-diaminopropane or salt thereof; an acid acceptor; a sulfur source; and a prevulcanization inhibitor wherein the improvement comprises providing as the prevulcanization inhibitor a combination of 4. A heat-curable composition according to claim 2 wherein the 1,3-diaminopropane comprises an N-aliphatic-1,3-diaminopropane wherein the aliphatic group is derived from tallow and is principally a mixture of saturated and unsaturated $C_{16}$ and $C_{18}$ moieties.

5. A heat-curable composition according to claim 2 wherein the sulfur source comprises elemental sulfur.

6. A heat-curable composition according to claim 2 wherein the acid acceptor comprises calcium oxide, magnesium oxide, or calcium hydroxide.

7. A heat-curable composition according to claim 6 wherein the acid acceptor comprises magnesium oxide.

8. A heat-curable composition according to claim 2 wherein the halopolymer comprises an elastomer-forming chlorinated polyethylene.

* * * * *